United States Patent
Ryu et al.

(10) Patent No.: US 8,099,372 B2
(45) Date of Patent: Jan. 17, 2012

(54) METHOD OF MODELING COMPOSITE EMOTION IN MULTIDIMENSIONAL VECTOR SPACE

(75) Inventors: Joung Woo Ryu, Daejeon (KR); Cheonshu Park, Daejeon (KR); Joo Chan Sohn, Daejeon (KR); Hyun Kyu Cho, Daejeon (KR); Young-Jo Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 852 days.

(21) Appl. No.: 12/147,541

(22) Filed: Jun. 27, 2008

(65) Prior Publication Data
US 2009/0248372 A1    Oct. 1, 2009

(30) Foreign Application Priority Data
Mar. 25, 2008   (KR) ........................ 10-2008-0027352

(51) Int. Cl.
*G06N 5/00* (2006.01)
*G06F 17/00* (2006.01)

(52) U.S. Cl. .................. 706/8; 703/3; 600/587; 463/36
(58) Field of Classification Search ........................ 706/8
See application file for complete search history.

(56) References Cited

U.S. PATENT DOCUMENTS

| | | | |
|---|---|---|---|
| 6,219,657 B1 | 4/2001 | Hatayama | |
| 7,065,490 B1 | 6/2006 | Asano et al. | |
| 2006/0122834 A1* | 6/2006 | Bennett | 704/256 |
| 2007/0233622 A1* | 10/2007 | Willcock | 706/16 |
| 2009/0253982 A1* | 10/2009 | Wang | 600/419 |

FOREIGN PATENT DOCUMENTS
JP    2007-34664    2/2007
KR    10-2004-0014123 A    2/2004

OTHER PUBLICATIONS

O. Popovici Vlad et al., "Model based Emotional Status Simulation", 2002 IEEE, Berlin, Germany, Sep. 25-27, 2002, pp. 93-98.
Hiroyasu Miwa et al., "Robot Personality based on the Equations of Emotion defined in the 3D Mental Space", 2001 IEEE, Seoul, Korea, May 21-26, 2001, pp. 2602-2607.

* cited by examiner

*Primary Examiner* — Omar Fernandez Rivas
*Assistant Examiner* — Kalpana Bharadwaj
(74) *Attorney, Agent, or Firm* — Fenwick & West LLP

(57) ABSTRACT

A method of modeling a composite emotion in a multidimensional vector space, is provided with creating an emotion vector space by defining dimensions of a vector space in consideration of stimuli affecting emotions, and dividing a defined multidimensional vector space into emotion regions. Further, the method of modeling a composite emotion in a multidimensional vector space includes creating a composite emotion by calculating a fuzzy partitioned matrix between a current state vector and respective representative vectors in the created emotion vector space.

5 Claims, 8 Drawing Sheets

FIG. 7

$$(\text{FPM}_{nm}) = \begin{pmatrix} \mu_{11} & \cdots & \mu_{1m} \\ \vdots & \ddots & \vdots \\ \mu_{n1} & \cdots & \mu_{nm} \end{pmatrix}$$

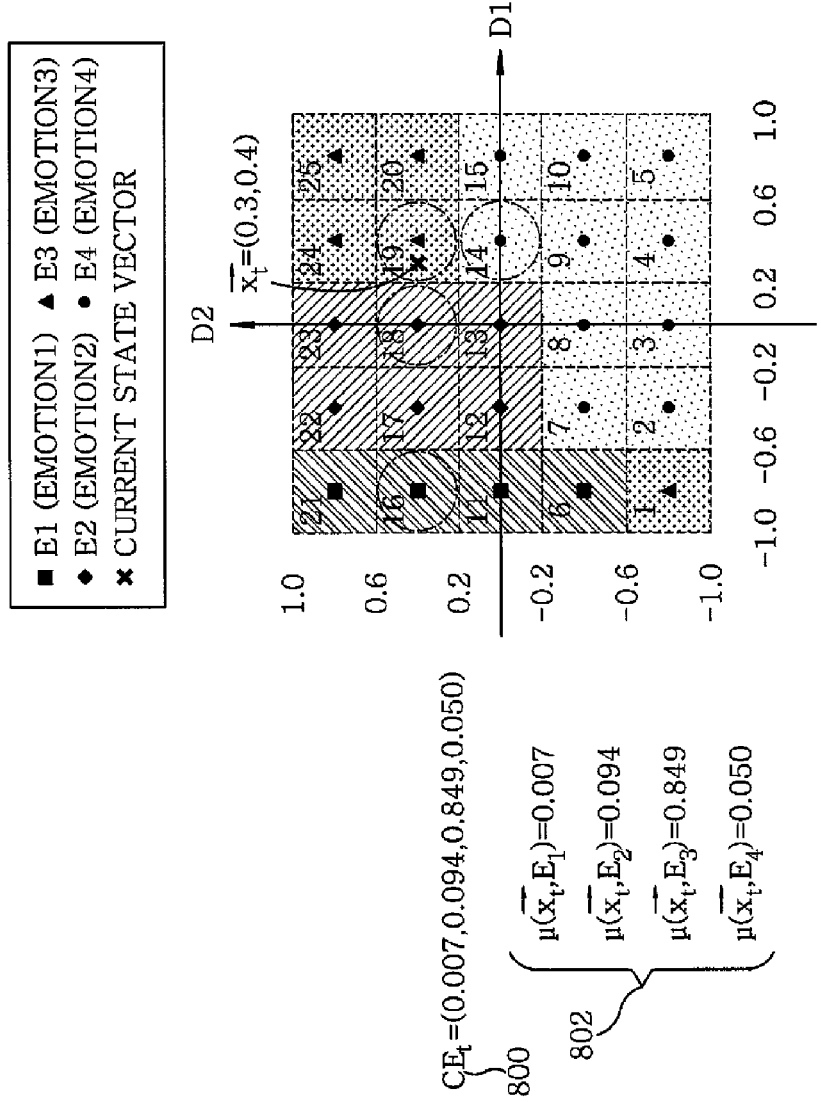

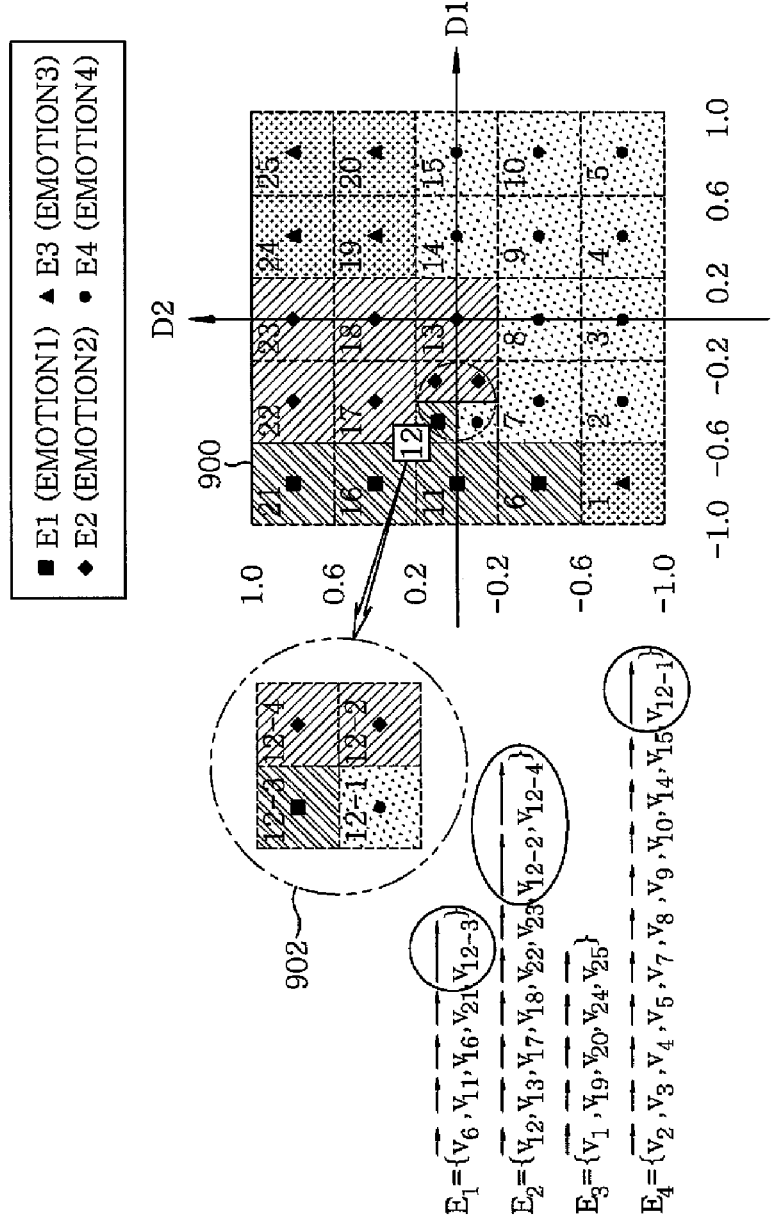

METHOD OF MODELING COMPOSITE EMOTION IN MULTIDIMENSIONAL VECTOR SPACE

CROSS-REFERENCE(S) TO RELATED APPLICATIONS

The present invention claims priority of Korean Patent Application No. 10-2008-0027352, filed on Mar. 25, 2008, which is incorporated herein by reference.

FIELD OF THE INVENTION

The present invention relates to emotion modeling technology, and, in particular, to a method of modeling a composite emotion in a multidimensional vector space, which is suitable for the performance of emotion modeling to provide more familiarity and realism to a device or a virtual reality avatar that can interact with humans.

This work was supported by the IT R&D program of MIC/IITA. [2006-S-026-02, Development of the URC Server Framework for Proactive Robotic Services]

BACKGROUND OF THE INVENTION

Prior art emotion modeling technology includes rule-based discrete emotion modeling and vector space-based continuous emotion modeling.

A representative example of discrete emotion modeling is an OCC (Ortony, Collins, and Clore)-based emotion model (Em), which was designed for the development of an emotional agent in the Oz Project, undertaken at Carnegie Mellon University. In the OCC model, similar emotions are defined as a single emotion type, and the cause due to which an emotion type occurs is also described in each defined emotion type. Furthermore, emotion types, which occur based on combinations of other emotion types, are defined. Em is designed to determine causes due to which emotions, defined based on the OCC model, occur and to create emotions having the intensities of occurrence based on the determined causes. Although the discrete emotion modeling method of creating relevant emotions according to predefined causes (conditions) has an advantage in that it is easy to implement and evaluate an emotion model, it has a disadvantage in that it is difficult to create emotions in unexpected situations because emotions can be represented only when the conditions are satisfied.

In continuous emotion modeling, the dimensions of a vector space are defined in consideration of stimuli affecting emotions, and an emotion vector space, that is, an emotion model, is created by dividing the defined vector space into emotion regions. In the emotion vector space, an arbitrary vector refers to an emotional state, and a current emotional state is calculated from an immediately previous emotional state and a currently detected stimulus. As a representative example, there is the Mental Space model, which is the three-dimensional emotion vector space used in WE-4R, which is a social robot that was developed at Waseda University. The continuous emotion modeling method has an advantage in that it can represent emotions even in unexpected situations.

Although the prior art continuous emotion modeling method has the above advantage, as described above, there are disadvantages in that it is not easy to divide a multidimensional emotion vector space into emotion regions, and, particularly, it is difficult to perform the representation of a composite emotion that simultaneously represents one or more emotions having the intensity of occurrence. There is a method of performing fuzzy division on a vector space using a fuzzy membership function in order to represent a composite emotion. However, this method has problems in that it is difficult to determine the shape of a fuzzy membership function and in that the efficiency related to the calculation time is decreased as the number of dimensions of an vector space increases. There is another method of creating a continuous emotion model using a neural network. However, this method has a problem in that it is not easy to construct learning data in consideration of all situations in order to teach a neural network model.

SUMMARY OF THE INVENTION

It is, therefore, an object of the present invention to provide a method of modeling a composite emotion in a multidimensional vector space, which can perform emotion modeling on a device or an avatar capable of interacting with humans so that the humans can feel more familiarity and realism from the device or the avatar.

Another object of the present invention is to provide a method of modeling a composite emotion in a multidimensional vector space, which is capable of representing a composite emotion in the multidimensional emotion vector space using a fuzzy partitioned matrix used in a fuzzy clustering algorithm.

Still another object of the present invention is to provide a method of modeling a composite emotion in a multidimensional vector space, which is capable of creating an emotion vector space by dividing a multidimensional vector space into emotion regions composed of subspaces and creating a composite emotion by calculating a fuzzy partitioned matrix between a current state vector and the representative vectors of the subspaces in the created emotion vector space.

In accordance with the present invention, there is provided a method of modeling a composite emotion in a multidimensional vector space, including creating an emotion vector space by defining dimensions of a vector space in consideration of stimuli affecting emotions, and dividing a defined multidimensional vector space into emotion regions; and creating a composite emotion by calculating a fuzzy partitioned matrix between a current state vector and respective representative vectors in the created emotion vector space.

BRIEF DESCRIPTION OF THE DRAWINGS

The objects and features of the present invention will become apparent from the following description of preferred embodiments given in conjunction with the accompanying drawings, in which:

FIG. 7 is a diagram showing a fuzzy partitioned matrix between a data set and a cluster set in accordance with a preferred embodiment of the present invention;

FIG. 8 is a drawing showing the composite emotion of a current state vector created by calculating a fuzzy partitioned matrix between the current state vector and a set of closest representative vectors for respective emotion regions in accordance with a preferred embodiment of the present invention; and FIG. 9 is a diagram showing an emotion region corrected by dividing every side of a subspace into the same size in an emotion vector space in accordance with a preferred embodiment of the present invention.

DETAILED DESCRIPTION OF THE EMBODIMENTS

Hereinafter, preferred embodiments of the present invention will be described in detail with reference to the accompanying drawings so that they can be readily implemented by those skilled in the art.

The operational principle of the present invention will be described in detail below with reference to the accompanying drawings. If, in the following description of the present invention, detailed descriptions of well-known functions or constructions may unnecessarily make the gist of the present invention obscure, the detailed descriptions will be omitted. The following terms are defined in consideration of functions in the present invention, and the meanings thereof may vary according to the intention of a user or an operator or according to usual practice. Therefore, the definitions of the terms must be interpreted based on the entire content of the present specification.

The present invention is configured to perform emotion modeling on a device or an avatar capable of interacting with humans in order to enable the humans to feel more familiarity and realism from the device or the avatar. The present invention is implemented to represent a composite emotion in a multidimensional emotion vector space using a fuzzy partitioned matrix used in a fuzzy clustering algorithm.

For this purpose, an emotion vector space is created by dividing a multidimensional vector space into emotion regions composed of subspaces, and a composite emotion is created by calculating a fuzzy partitioned matrix between a current state vector and the representative vectors of the subspaces in the created emotion vector space.

The present invention will be described in detail below in conjunction with the embodiments. Meanwhile, although the method of modeling a composite emotion according to the present invention will be described using a two-dimensional vector space as an example, it will be apparent that the present invention can be applied to a multidimensional vector space having two or more dimensions.

Figure 1:
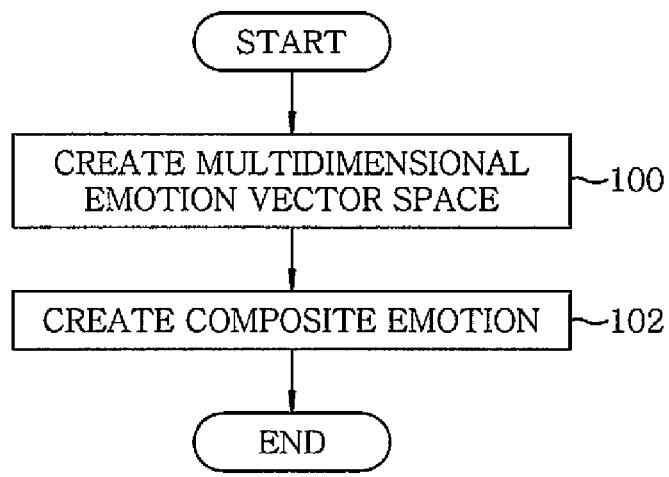
FIG. 1 is a flowchart showing a process of creating a composite emotion in accordance with a preferred embodiment of the present invention.

FIG. 1 is a flowchart showing a process of creating a composite emotion in accordance with a preferred embodiment of the present invention.

Referring to FIG. 1, in order to create a composite emotion in a multidimensional vector space, the multidimensional emotion vector space is created at step 100, and then the composite emotion is created at step 102. In greater detail, the step of creating the multidimensional emotion vector space is the step of determining an emotion region using the representative vector of a subspace in a multidimensional vector space, as illustrated in the following FIG. 2.

Figure 2:
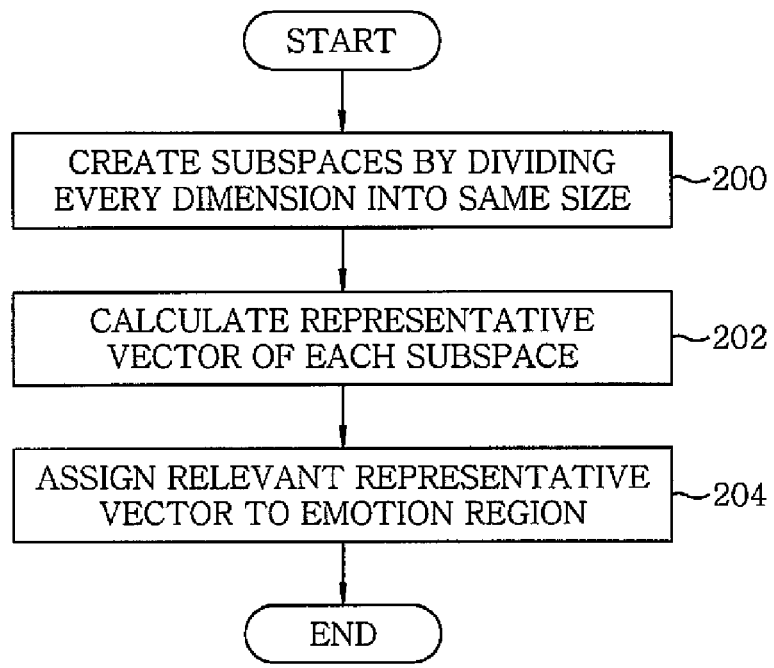
FIG. 2 is a flowchart showing a process of creating a multidimensional emotion vector space in accordance with a preferred embodiment of the present invention.

FIG. 2 is a flowchart showing a process of creating a multidimensional emotion vector space in accordance with a preferred embodiment of the present invention.

Referring to FIG. 2, the dimensions of a vector space are defined in consideration of stimuli affecting emotions at step 200, wherein subspaces are created by dividing every dimension into the same size, the representative vector of each subspace is calculated at step 202, and the relevant representative vector is assigned to an emotion region at step 204, thereby creating the multidimensional emotion vector space.

In an emotion vector space, an arbitrary vector means an emotional state, and a current emotional state or a current state vector is calculated from an immediately previous emotional state and a currently sensed stimulus.

Figure 3:
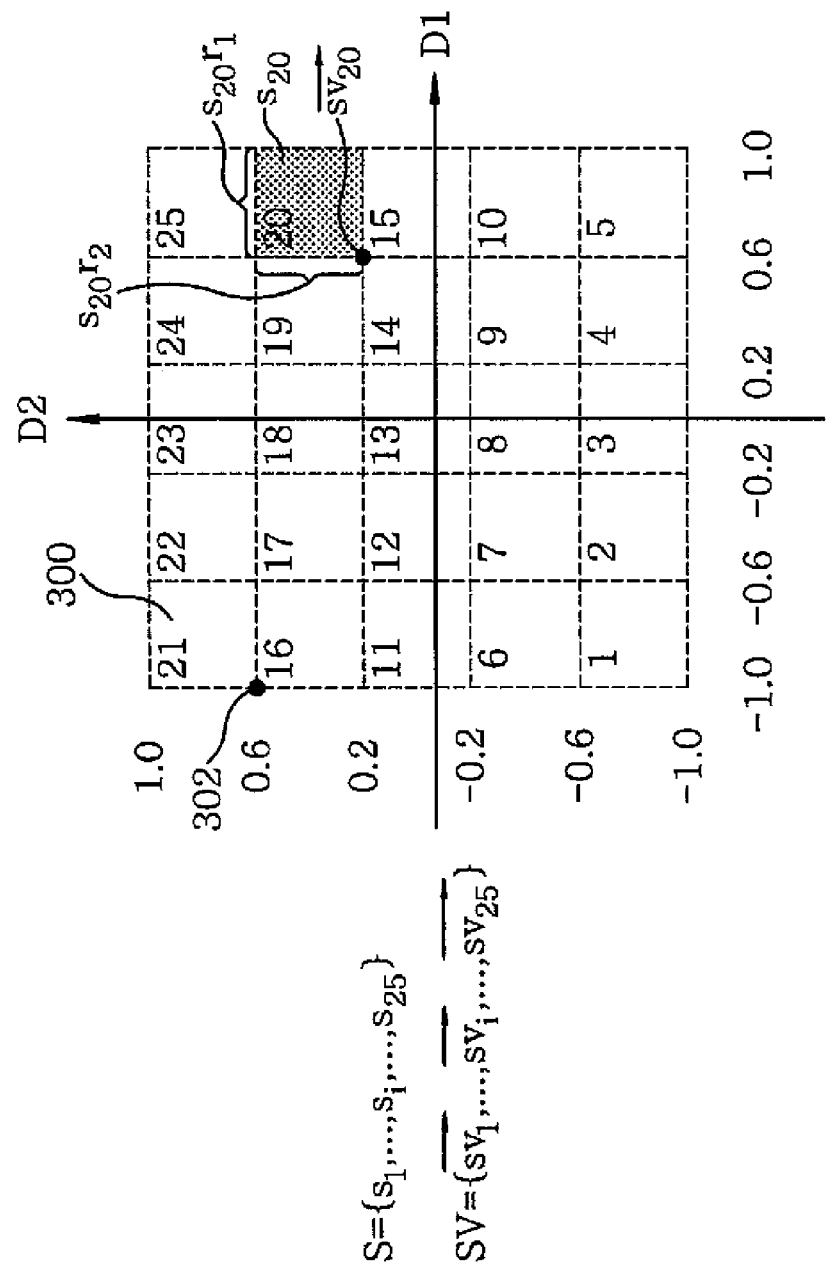
FIG. 3 is a diagram showing subspaces created by dividing every dimension into the same size in a two-dimensional vector space in accordance with a preferred embodiment of the present invention.

That is, since, at step 200, subspaces 300 are created by dividing every dimension of a two-dimensional vector space into the same size, as shown in FIG. 3, all sides of every subspace have the same size r, as described in the following Equation 1:

$$r = (s_1 r_1 = \ldots = s_1 r_m) = \ldots = (s_i r_1 = \ldots s_i r_m) = \ldots = (s_n r_1 = \ldots s_n r_m) \quad (1)$$

where m and n are the number of dimensions of the vector space and the number of created subspaces, respectively. $s_i r_j$ is the side of jth dimension of ith subspace.

Meanwhile, the representative vector of the subspace $s_i$ created at step 202 is calculated, as described in the following Equation 2:

$$\vec{v}_i = <v_{i1}, \ldots, v_{ij}, \ldots, v_{im}>$$

$$v_{ij} = sv_{ij} + \frac{r}{2} \quad (2)$$

That is, a representative vector refers to the center of a subspace. Here, $sv_{ij}$ is the value of the jth element of the starting vector $\vec{sv}_i$, which is the origin of the subspace $s_i$. The starting vector 302 is defined as an apex having the smallest value among the apexes of a subspace.

Figure 4:
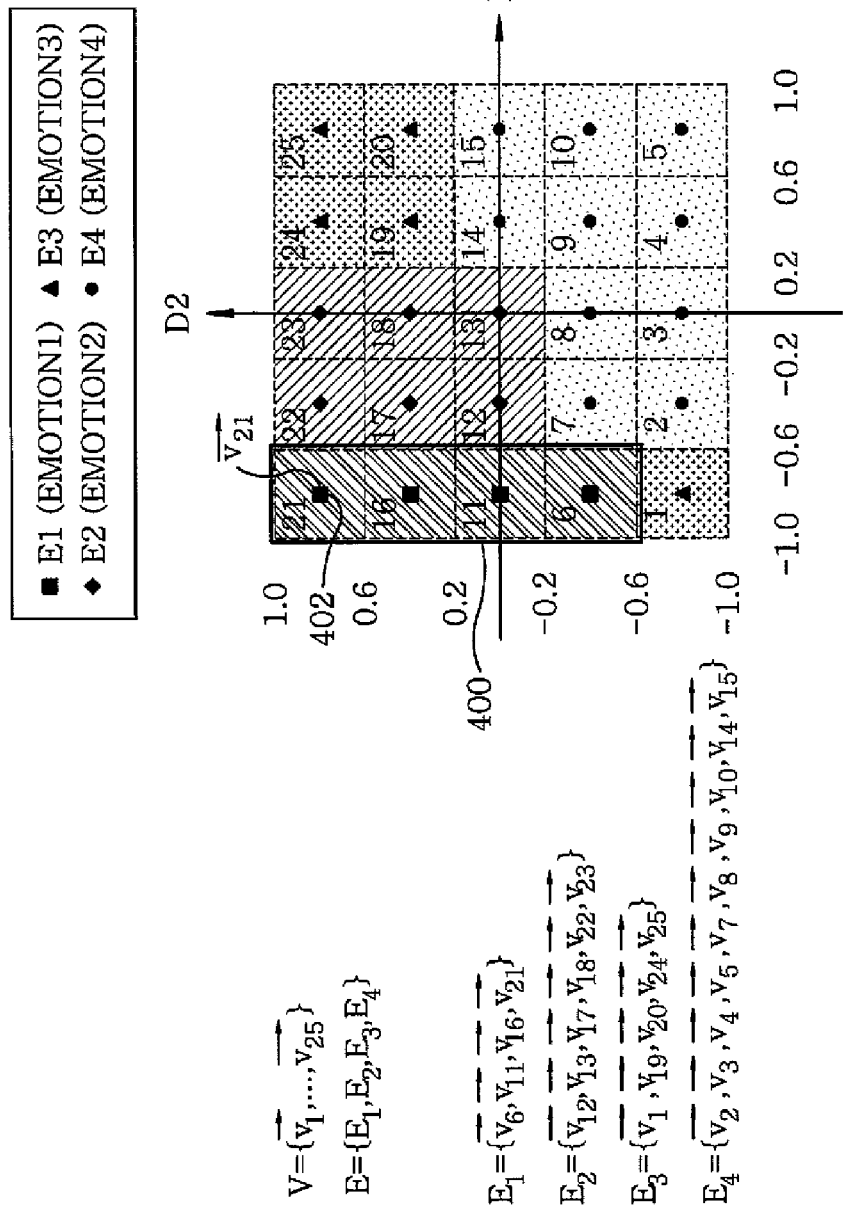
FIG. 4 is a diagram showing an emotion vector space in which an emotion region is represented using the representative vectors of subspaces in accordance with a preferred embodiment of the present invention.

FIG. 4 is a diagram showing an emotion vector space in which an emotion region is represented by the representative vectors of subspaces in accordance with a preferred embodiment of the present invention.

Referring to FIG. 4, an emotion region 400 may be represented by divided subspaces. Accordingly, an emotion region is represented as a set of representative vectors 402, as described in the following Equation 3:

$$V = \{\vec{v_1}, \ldots, \vec{v_n}\}, E = \{E_1, \ldots, E_h\} \quad (3)$$

$$E_k = \left\{ \vec{v_i} \mid \forall \vec{v_i} \in V \right\}, 1 \leq k \leq h$$

$$\bigcap_{k=1}^{h} E_k = \emptyset, \bigcup_{k=1}^{h} E_k = V$$

where V is a set of representative vectors, and E is a set of emotions to be represented in the emotion vector space. $E_k$ is an emotion corresponding to the kth emotion region. Furthermore, n and h are the number of created representative vectors and the number of emotions capable of being represented in the emotion vector space, respectively. In particular, the number of created representative vectors is equal to the number of created subspaces.

Figure 5:
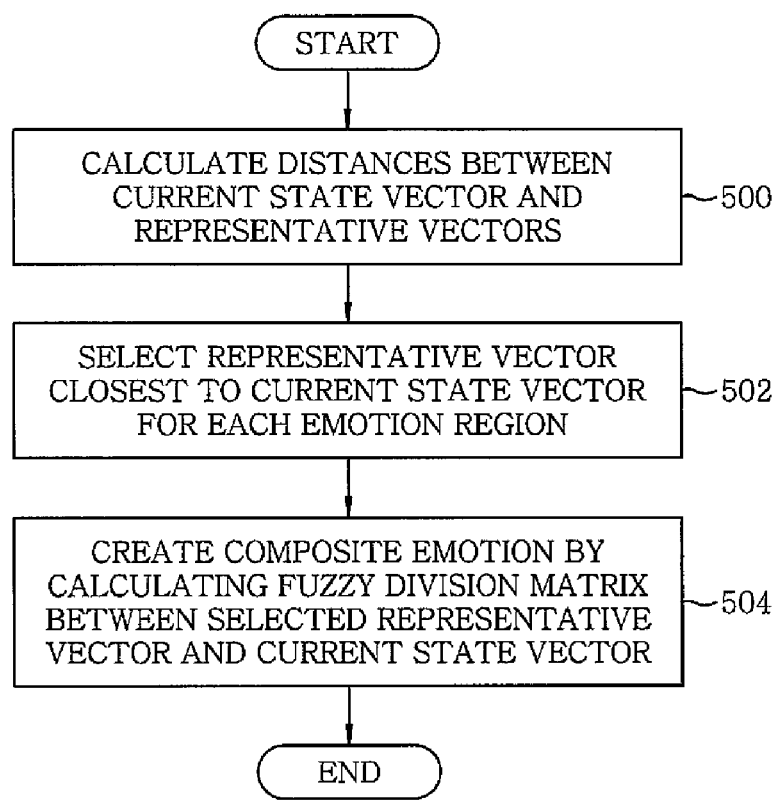
FIG. 5 is a flowchart showing a process of creating a composite emotion in accordance with a preferred embodiment of the present invention.

FIG. 5 is a flowchart showing a process of creating a composite emotion in accordance with a preferred embodiment of the present invention.

Referring to FIG. 5, when a current state vector is created in an emotion vector space, as shown in FIG. 4, the distances between the current state vector and the representative vectors are calculated at step 500, and the representative vector closest to the current state vector is selected for each emotion region at step 502. Thereafter, at step 502, the state vector is created as a composite emotion by calculating a fuzzy partitioned matrix between the selected representative vectors and the current state vector.

Figure 6:
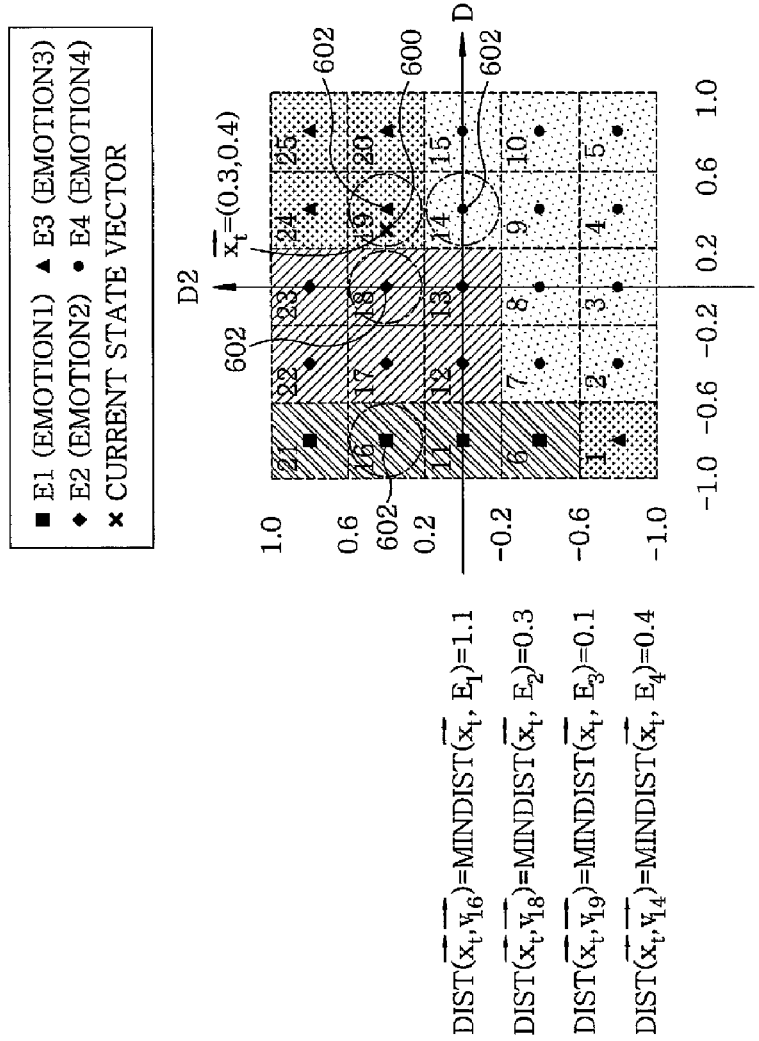
FIG. 6 is a drawing showing a current state vector, created in an emotion vector space, and the closest representative vectors for respective emotion regions in accordance with a preferred embodiment of the present invention.

FIG. 6 is a drawing showing a current state vector, created in an emotion vector space, and the closest representative vector for each emotion region. When a current state vector 600 is created in an emotion vector space, as shown in FIG. 6, the distances between the current state vector 600 and all representative vectors are calculated. The distances between a state vector and representative vectors at time t are calculated in Euclidean distance form, as shown in the following Equation 4:

$$\vec{v_i} = <v_{i1}, \ldots, v_{im}>, \vec{x_t} = <x_{t1}, \ldots, x_{tm}> \quad (4)$$
$$dist(\vec{x_t}, \vec{v_i}) = \sqrt{\sum_{j=1}^{m}(x_{tj} - v_{ij})^2}$$

wherein m is the number of dimensions in the emotion vector space.

When the distances between the current state vector and all representative vectors are calculated, the closest representative vectors are selected for respective emotion regions. A fuzzy partitioned matrix is calculated based on the relative ratios between the distances between selected representative vectors 602 and the current state vector, as shown in the following Equation 5:

$$V = \{\vec{v_1}, \ldots, \vec{v_n}\}, E = \{E_1, \ldots E_h\} \quad (5)$$
$$E_k = \{\vec{v_i^k} \mid \forall \vec{v_i^k} \in V\}, 1 \leq k \leq h$$
$$mindist(\vec{x_t}, E_k) = \underset{i}{\operatorname{argmin}}(dist(\vec{x_t}, \vec{v_i^k}))$$
$$\mu_{tk} = \mu(\vec{x_t}, E_k) = \frac{1}{\sum_{j=1}^{h}\left(\frac{mindist(\vec{x_t}, E_k)}{mindist(\vec{x_t}, E_j)}\right)^{\frac{2}{m-1}}}$$

where $mindist(\vec{x}_t, E_k)$ is a function for calculating the closest distance to the current state vector $\vec{x}_t$ in the emotion region $E_k$, and $\mu(\vec{x}_t, E_k)$ is a function for calculating the possibility of the current state vector being included in the emotion region $E_k$. Here, as the value of m∈(1,∞) increases, the possibility of being included in every emotion region becomes more uniform. Therefore, calculation is performed with m set to 2. $v_i^k$ is the representative vector of the ith subspace included in the emotion region $E_k$.

FIG. 7 is a diagram showing a fuzzy partitioned matrix between a data set and a cluster set in accordance with a preferred embodiment of the present invention.

Referring to FIG. 7, a fuzzy partitioned matrix 700 used in fuzzy clustering is a matrix that includes the possibility of data being included in each cluster as each element 702. In particular, the fuzzy partitioned matrix 700 must satisfy the condition that the sum of row values is 1.0, as shown in the following Equation 6:

$$D = \{d_1, \ldots, d_n\}, C = \{c_1, \ldots, c_m\} \quad (6)$$
$$\sum_{i=1}^{m}\mu_{ji} = 1, d_j \in D, 0 \leq \mu_{ji} \leq 1$$

where D is a data set and C is a cluster set. Furthermore, n and m are the number of pieces of data and the number of clusters, respectively. $\mu_{ji}$ is the possibility of the jth data $d_j$ being included in the ith cluster $c_i$ and is calculated using μ(d,c) in Equation 5. Accordingly, Equation 6 means that the sum of possibilities of data $d_j$ being included in every cluster must be 1.0.

FIG. 8 is a drawing showing the composite emotion of a current state vector created by calculating a fuzzy partitioned matrix between the current state vector and a set of closest representative vectors for respective emotion regions in accordance with a preferred embodiment of the present invention.

Referring to FIG. 8, the composite emotion 800 $CE_t$ of the current state vector is represented using h elements, as shown in the following Equation 7:

$$CE_t = (\mu(\vec{x}_t, E_1), \mu(\vec{x}_t, E_2), \ldots, \mu(\vec{x}_t, E_h)) \quad (7)$$

where respective elements are the possibilities 802 calculated in Equation 5, and h is the number of emotions to be represented in the emotion vector space.

As described above, using the above-described method, it is possible to define a plurality of emotions having possibilities as a composite emotion and create the composite emotion in the created emotion vector space. This can be implemented through the modeling of the created composite emotion for a device or an avatar capable of interacting with humans so that the humans feel more familiarity and realism from the device or the avatar.

Meanwhile, it is possible to subdivide a specific subspace in the created multidimensional emotion vector space.

FIG. 9 is a diagram showing an emotion region corrected by dividing every side of a subspace into the same size in an emotion vector space in accordance with a preferred embodiment of the present invention.

Referring to FIG. 9, in the case where it is necessary to subdivide a specific subspace in a created multidimensional emotion vector space 900, an emotion region can be changed in the emotion vector space when the emotion region is created by applying the multidimensional emotion vector space creation step 100 of FIG. 1 only to a subspace 902. Since the emotion region can be changed based on feedback using the above mechanism, it is possible to expand the present invention to modeling capable of representing characters and personalities.

As described above, the present invention is configured to perform emotion modeling on a device or an avatar in order to enable humans to feel more familiarity and realism from the device or the avatar that can interact with the humans. The present invention is implemented to represent a composite emotion in a multidimensional emotion vector space using a fuzzy partitioned matrix used in a fuzzy clustering algorithm.

According to the present invention, the advantages achieved by the representative inventions of the disclosed inventions, will be described in brief below.

The present invention is configured to be able to represent a composite emotion in continuous emotion modeling capable of representing emotions even in unexpected situations. Since a composite emotion is capable of representing various changes in emotions, compared to a single emotion, there are advantages in that, through natural interaction, familiarity and realism can not only be increased, but the interest of a user can be also attracted continuously, when modeling is applied to a device or an avatar that interacts with humans.

While the invention has been shown and described with respect to the preferred embodiments, it will be understood by those skilled in the art that various changes and modifications may be made without departing from the spirit and scope of the invention as defined in the following claims.

What is claimed is:

1. A computerized method of modeling a composite emotion in a multidimensional vector space, comprising:
   creating an emotion vector space by defining dimensions of a vector space in consideration of stimuli affecting emotions, and dividing a defined multidimensional vector space into emotion regions; and
   creating a composite emotion by calculating a fuzzy partitioned matrix between a current state vector and respective representative vectors in the created emotion vector space, each of the representative vectors corresponding to a center of a corresponding one of subspaces of the multidimensional vector space,
   wherein the creating the emotion vector space comprises:
   creating the subspaces by dividing every dimension of the multidimensional vector space into a same size; and
   calculating the representative vectors of the created subspaces and dividing the multidimensional vector space into the emotion regions to which the representative vector are respectively assigned.

2. The method as set forth in claim 1, wherein the creating the composite emotion comprises calculating and creating the fuzzy partitioned matrix based on relative ratios between distances between the current state vector and the respective representative vectors in the created emotion vector space.

3. The method as set forth in claim 1, wherein the creating the composite emotion comprises:
   calculating distances between the current state vector and the representative vectors in Euclidean distance form;
   selecting a representative vector closest to the current state vector for each emotion region; and
   creating a plurality of composite emotions for the current state vector by calculating the fuzzy partitioned matrix between the selected representative vectors and the current state vector.

4. The method as set forth in claim 1, further comprising:
   creating subdivided subspaces by dividing every side of a specific subspace into a same size based on feedback; and
   calculating representative vectors of the subdivided subspaces, and assigning the representative vectors of subdivided subspaces to the emotion regions.

5. The method as set forth in claim 1, further comprising modeling the created composite emotion for a device or an avatar that interacts with a human.

* * * * *